United States Patent
Ellen et al.

(10) Patent No.: US 7,574,976 B2
(45) Date of Patent: Aug. 18, 2009

(54) BIRD FEEDER POST AND DEVICE TO INHIBIT SQUIRRELS

(76) Inventors: Jeffrey A. Ellen, 2950 Buchanan Rd., Marne, MI (US) 49345; Kim A. Sena, 8841 E. Fulton St., Ada, MI (US) 49301

( * ) Notice: Subject to any disclaimer, the term of this patent is extended or adjusted under 35 U.S.C. 154(b) by 521 days.

(21) Appl. No.: 11/257,953

(22) Filed: Oct. 25, 2005

(65) Prior Publication Data

US 2006/0102083 A1 May 18, 2006

Related U.S. Application Data

(60) Provisional application No. 60/624,436, filed on Nov. 2, 2004.

(51) Int. Cl.
*A01K 39/01* (2006.01)
(52) U.S. Cl. ..................... 119/57.9; 119/52.3
(58) Field of Classification Search .............. 119/52.3, 119/57.9, 52.2, 57.8, 59, 52.4, 63, 428, 429; D30/124; 52/101; 43/108, 124
See application file for complete search history.

(56) References Cited

U.S. PATENT DOCUMENTS

| | | | |
|---|---|---|---|
| 4,031,856 A | 6/1977 | Chester | |
| 4,523,546 A | 6/1985 | Latham | |
| 5,156,112 A * | 10/1992 | Brown | 119/57.9 |
| 5,195,459 A * | 3/1993 | Ancketill | 119/57.9 |
| 5,285,748 A * | 2/1994 | Weldin | 119/57.9 |
| 5,690,056 A * | 11/1997 | Korb | 119/52.3 |
| 5,720,238 A * | 2/1998 | Drakos | 119/57.9 |
| 5,878,537 A * | 3/1999 | Flischel | 52/101 |
| 6,098,348 A | 8/2000 | Weaver | |
| 6,125,595 A * | 10/2000 | Showalter | 52/101 |
| D449,719 S | 10/2001 | Nylen | |
| 6,532,894 B2 | 3/2003 | Johnson | |
| 6,640,746 B1 * | 11/2003 | Lund | 119/57.9 |

* cited by examiner

*Primary Examiner*—T Nguyen
(74) *Attorney, Agent, or Firm*—Jeffrey A. Ellen; Kim A. Sena

(57) ABSTRACT

A new post and squirrel barrier for bird feeders is disclosed with a post, a shroud assembly, and an ornamental plaque, where the shroud has an inverse tapered exterior and it is also suspended and allowed to have a defined range of motion in response to an attempt by a squirrel (or other animal) to climb the bird feeder post. The invention also includes a integrated auger for enhanced installation of the post into the ground.

4 Claims, 19 Drawing Sheets

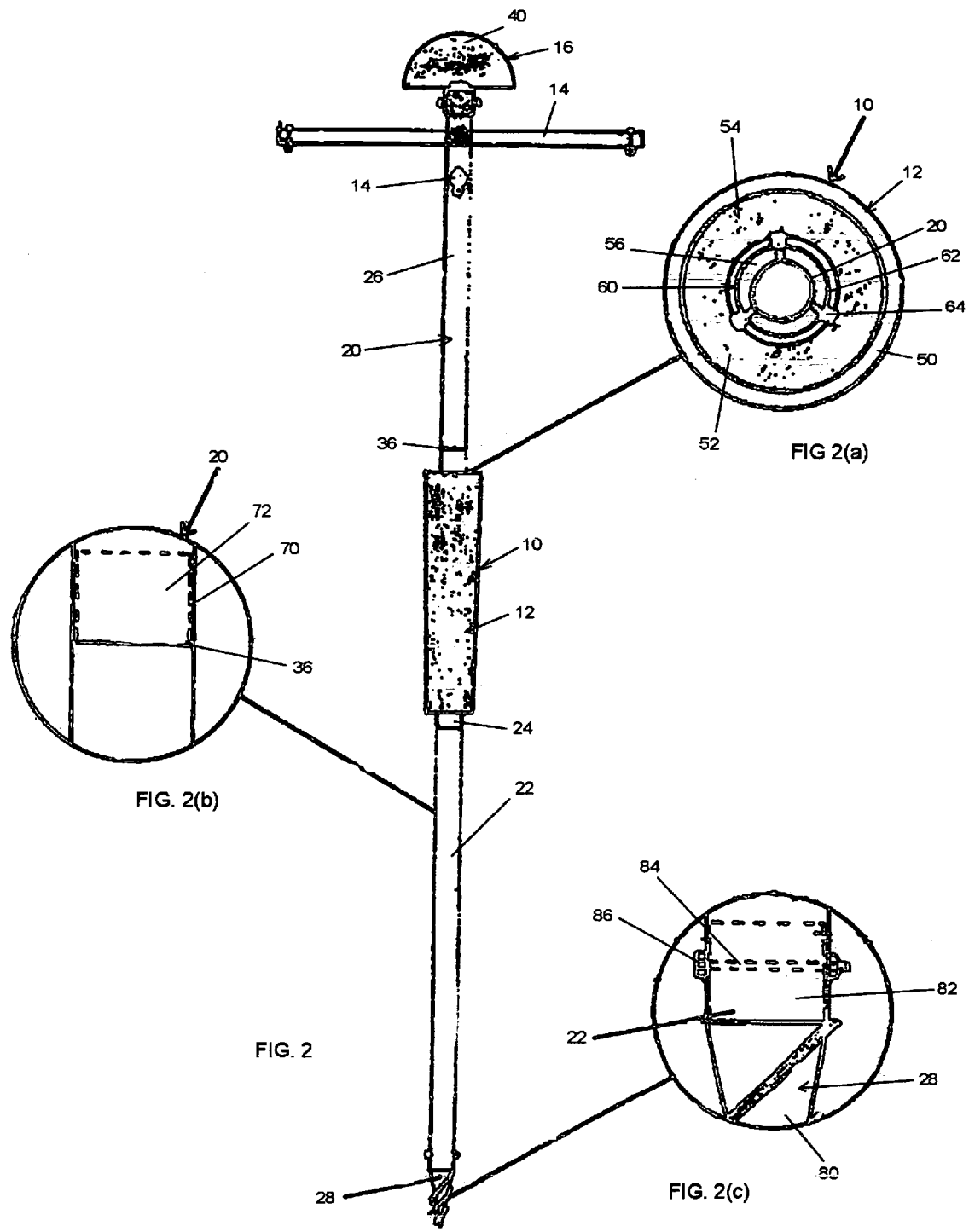

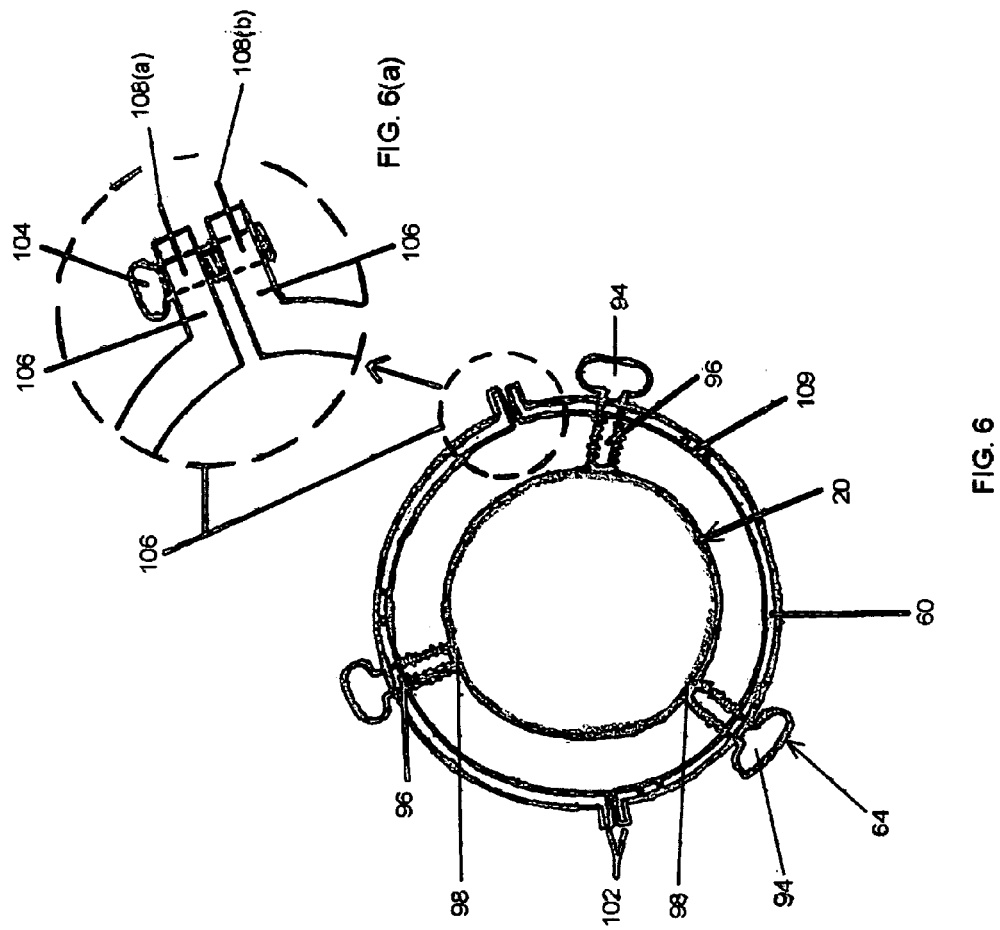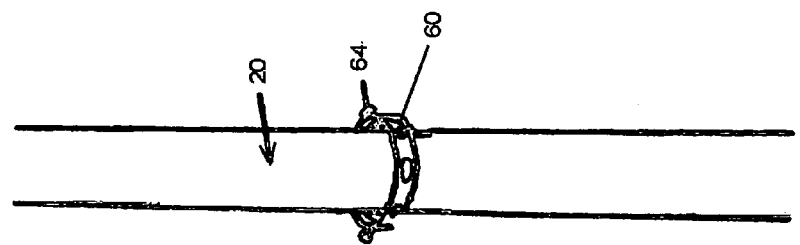

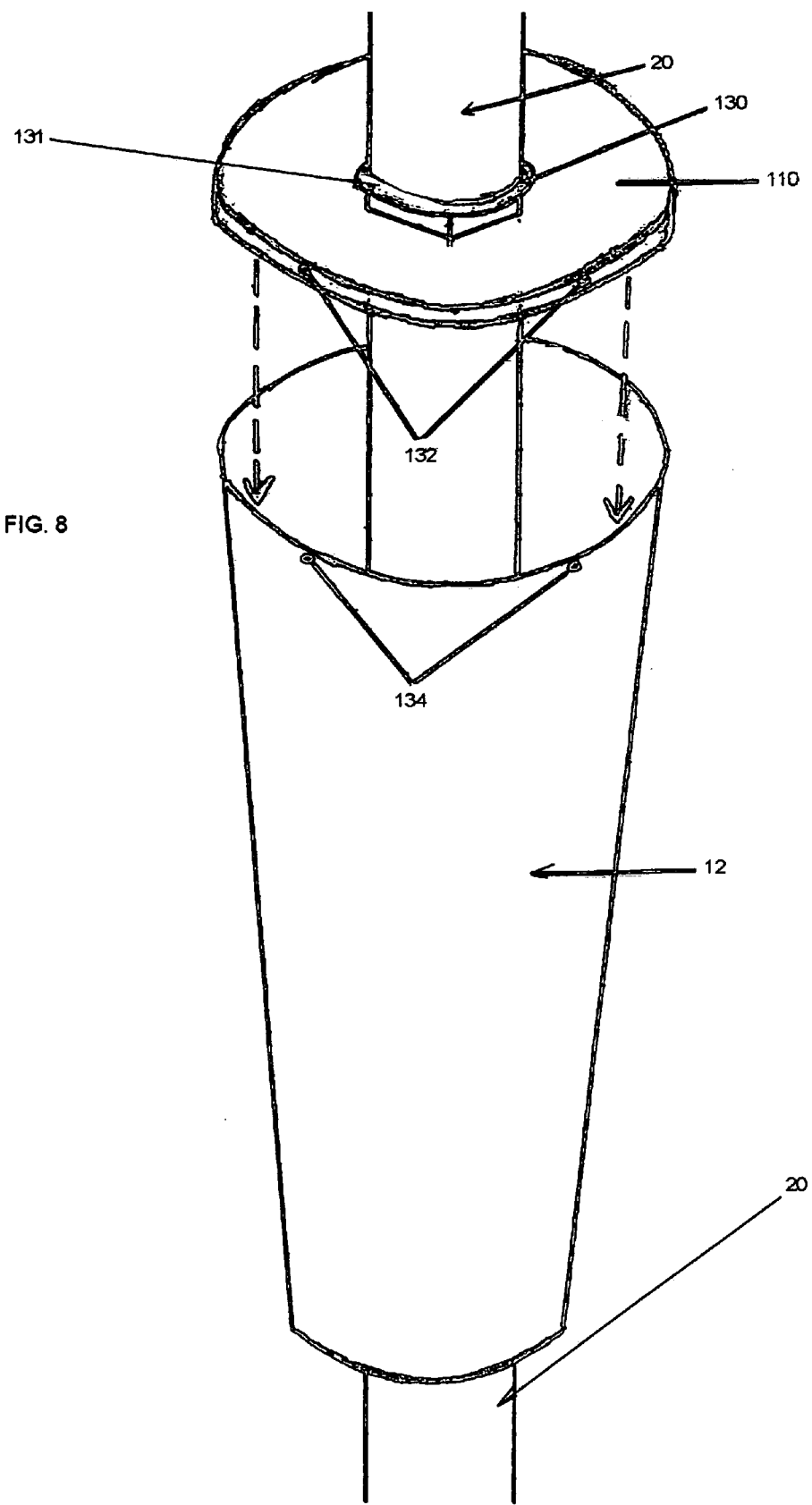

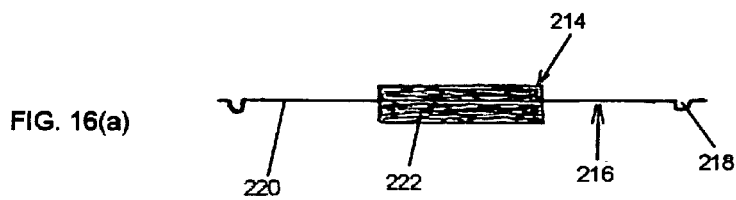
FIG. 16(a)
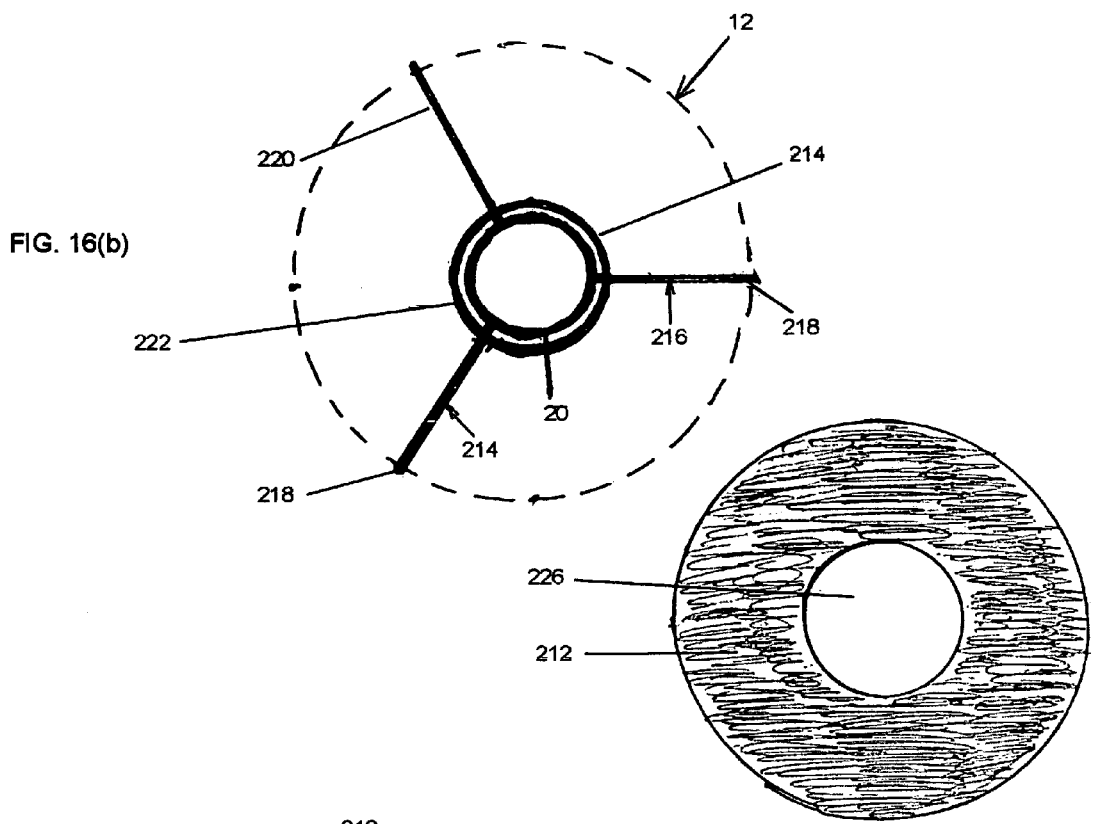
FIG. 16(b)
FIG. 16(c)
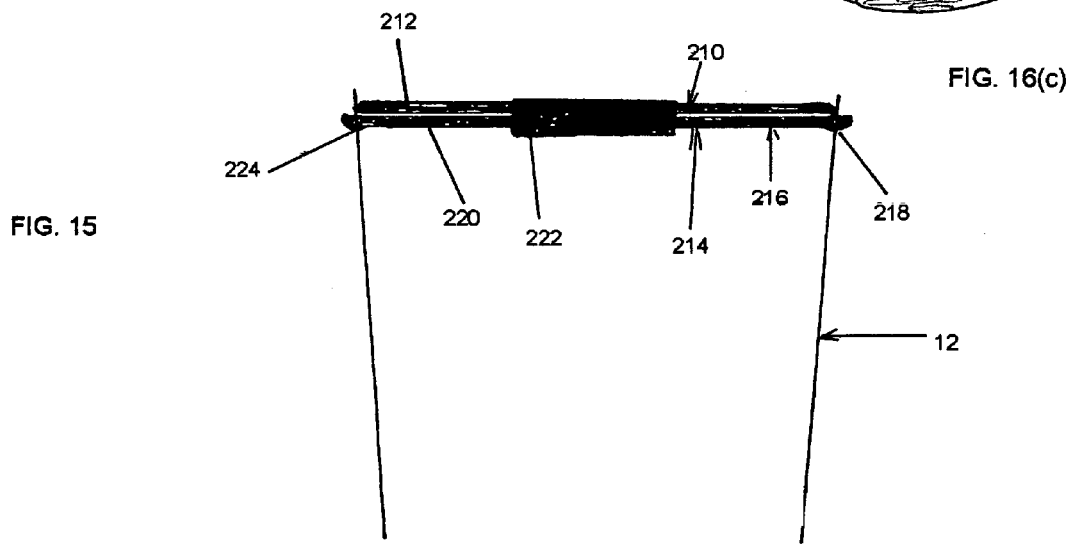
FIG. 15

US 7,574,976 B2

BIRD FEEDER POST AND DEVICE TO INHIBIT SQUIRRELS

CROSS REFERENCE TO RELATED APPLICATIONS

The present application is related to Provisional Patent filing, Ser. No. 60-624,436, filed on or about Nov. 2, 2004, and entitled, "A Bird Feeder Post and Device to Inhibit Squirrels.

STATEMENT REGARDING FEDERALLY SPONSORED RESEARCH OR DEVELOPMENT

Not applicable.

FIELD OF THE INVENTION

The present invention relates generally to a bird feeder apparatus. More specifically, the present invention relates to a post for suspending or holding a bird feeder, where the post incorporates a device for the purpose of inhibiting squirrels (or other animals) from climbing the post or otherwise gaining access to the bird feeder.

BACKGROUND OF THE INVENTION

Millions of people around the world enjoy feeding birds, in many cases with bird feeders hanging from posts in their yards. This enjoyment is frequently interrupted by the sight of a squirrel climbing up the post and stealing the birdseed from the feeder. Many devices and tactics have been developed over time to deter squirrels (and other such pests) from their thievery. The efficacy of such prior art attempts have been notably lacking and have left the avid bird feeder owner with less than the desired result.

Various approaches that have been taken to thwart the backyard piracy typically look to inserting a barrier between the squirrel and the bird feeder. Such devices include a cylindrical shaped barriers such as disclosed in U.S. Design Pat. No. 449,719, or flat disc-shaped devices such as shown in U.S. Pat. No. 4,523,546, or inverted disc-shaped devices such as taught in U.S. Pat. No. 6,098,348, or dome-shaped devices like the version shown in U.S. Pat. No. 4,031,856.

Other approaches include the use of devices that dynamically interrupt the access by a squirrel through the use of motion, such as that shown in U.S. Pat. No. 6,532,894 where the up-and-down motion of that device discourages the squirrel from climbing the post for a bird feeder. Self-help remedies that are known include the selective use of noise or lights, or in the extreme, shooting the offending animals.

The problems associated with the prior art devices is that they still have do not reach the satisfaction level of the user insofar as preventing the raids on the birdseed. Sometimes this arises from the squirrel's uncanny ability to "learn" the approach for deterrence and to seek ways to evade the device. This is true because the prior art devices known to the applicants rely upon a single effect to bar the squirrels' from climbing, when the use of multiple effects create a much greater degree of difficulty for the animal. In addition, it is another problem associated with the prior art, that the devices that are made for installation onto a supporting post for a bird feeding station do not fit each application uniformly.

SUMMARY OF THE INVENTION

A post for a bird feeder in accordance with the present invention, comprises a post with a top and a bottom, where the top portion includes a means for hanging or holding a bird feeder, and where the bottom portion includes a tip suitable for planting the post in the ground, and where a shroud is resiliently suspended in annular alignment, and is generally disposed in the middle portion of said post. The shroud is cylindrical and is somewhat conical in configuration, whereby the shroud is tapered towards the bottom of the post.

An enhancement of the present invention includes an ornamental plaque that is mounted onto the top of the post and provides a decorative feature to the assembly which may include graphic depictions and/or sculpted or embossed reliefs that would appeal to the homeowner.

The shroud is biasedly suspended by a spring assembly that allows simultaneous vertical, lateral, and/or forward-and-back movement when a squirrel attempts to climb onto the shroud.

Other embodiments of the present invention include a version of a shroud assembly that can be installed on a previously installed post, and which can be installed by a homeowner.

These and other attributes of the present invention will be shown in more detail below, however, it is understood that the description of the invention herein is not intended to be limiting in terms of its form and applications.

BRIEF DESCRIPTION OF THE DRAWINGS

FIG. 2 is a side elevational view of the bird feeder post of FIG. 1, with specific components detailed.

FIG. 2(a) is a cross sectional view of a mid-portion of the post of the present invention, showing the interior of the shroud (without the shroud cap).

FIG. 2(b) is a detail of a side view of the post of the present invention, showing a joint for post segments.

FIG. 2(c) is a detail of a side view of the post of the present invention, showing the bottom end of the post, specifically disclosing the connection of an auger tip to the post.

FIG. 5 is a side perspective view of the post and the universal ring support mounted thereon.

FIG. 6 is a top view of the universal ring support of FIG. 5, as mounted on a post.

FIG. 6(a) is a detail of the universal ring support as shown in FIG. 6.

FIG. 8 is a side perspective view of the shroud assembly of FIG. 7 showing the shroud cap and the installation alignment for same.

FIG. 15 is a side elevational view showing another embodiment of a shroud assembly of the present invention, showing in particular, the shroud cap and the universal ring support.

FIG. 16(a) is a side elevational view of the alternate embodiment depicted in FIG. 15, showing the universal ring support.

FIG. 16(b) is a top view of the universal ring support of FIG. 16(a).

FIG. 16(c) is a top view of the cap portion of the shroud cap assembly of FIG. 15.

DETAILED DESCRIPTION OF THE PREFERRED EMBODIMENTS

The bird feeding post of the present invention represents a very surprising package of safeguards for preventing squirrels and other small animals from poaching birdseed from bird feeders. As mentioned above, this long-standing problem has inspired some responses, however, none have encompassed the multiple methods in such a compact package as is disclosed herein.

Figure 1:
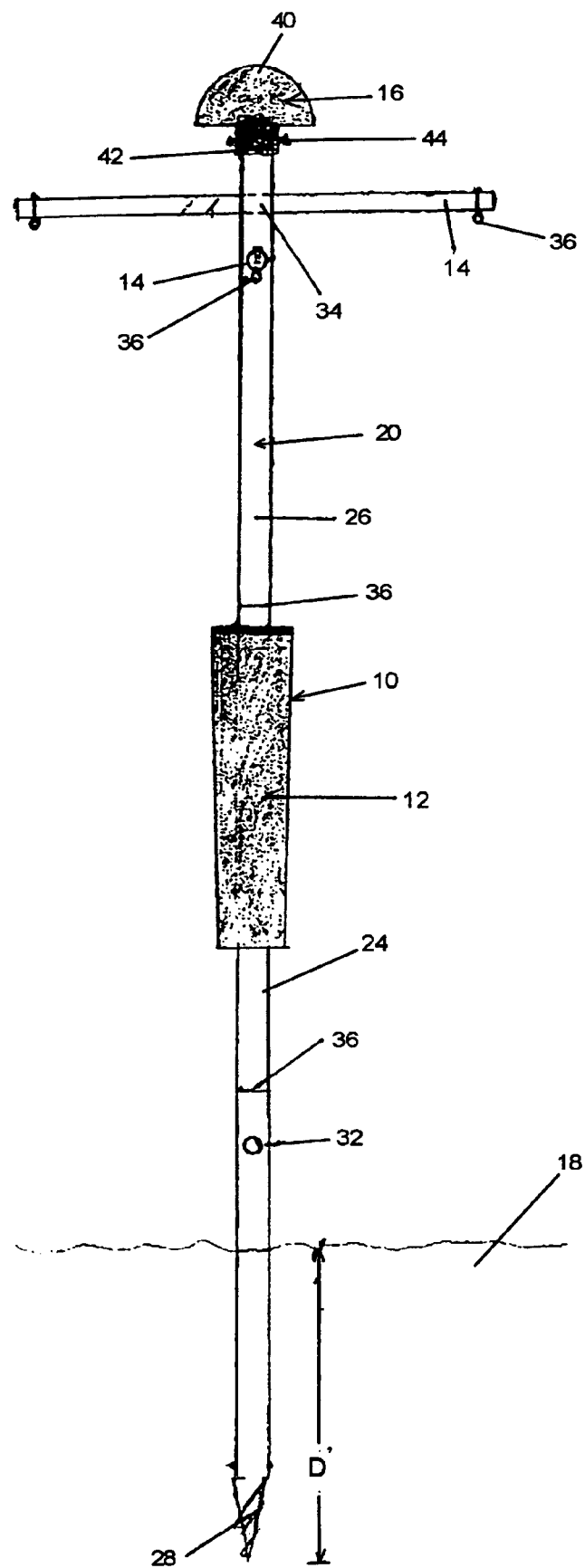
FIG. 1 is a side elevational view of the bird feeder post of the present invention as installed and ready for use.

Turning to FIG. 1, a bird feeder post of the present invention is shown generally, with shroud assembly 10, shroud 12, bird feeder support(s) 14, ornamental plaque 16, and post 20. The post is further comprised of the lower post segment 22, the middle post segment 24 and the upper post segment 26. The post segments are demarcated by post joints 36. Located on the bottom end portion of the lower post segment 22, is the auger 28.

The bird feeder post also includes the post driver orifice 32, the support orifice 34 and the eyelet(s) 36. The ornamental plaque 16 also includes the plaque top 40, the plaque base 42 and the plaque base set screw 44.

As may be observed in FIG. 1, the bird feeder post is represented as having been planted into the ground 18. The distance below ground is represented by "D" which is typically considered to be 12" although this will vary depending on soil conditions and other factors.

More details of the bird feeder post can be seen in FIG. 2 where detailed callouts FIGS. 2(a), 2(b) and 2(c) are provided. Commencing with FIG. 2(a), the interior of the shroud 12 can be seen, with the post 20 located concentrically therein. The shroud assembly also includes the upper shroud lip 50, the shroud interior 52, the upper shroud opening 54, and the lower shroud opening 56. Located within the shroud interior 52, is the universal ring support 60 which comprises the universal ring 62 and the ring screws 64.

Moving on to FIG. 2(b), the post joint 36 is shown to be formed from the insertion of the male post portion 72 into the female post receiver 70.

The details in FIG. 2(c) include the auger 28 located at the bottom end of the lower post segment 22, and which itself is comprised of the auger head 80, the auger base 82, the auger pin 84 and the auger pin orifice 86.

Figure 4:
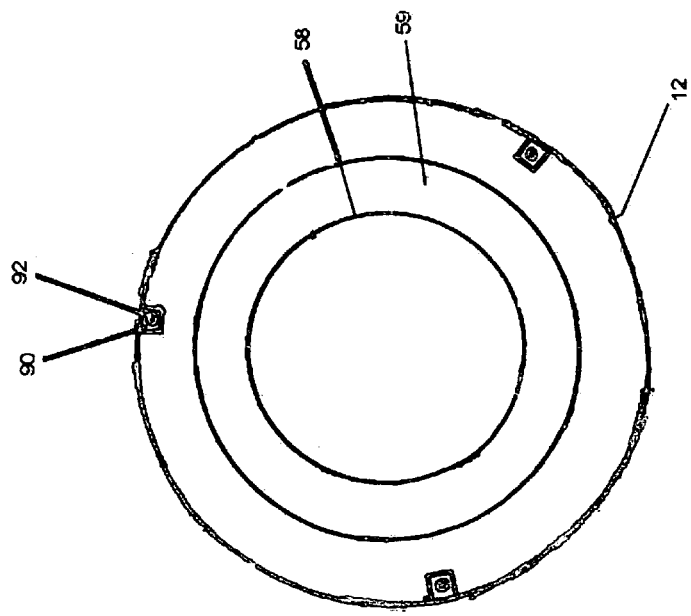
FIG. 4 is a top view of the shroud of FIG. 3.
Figure 3:
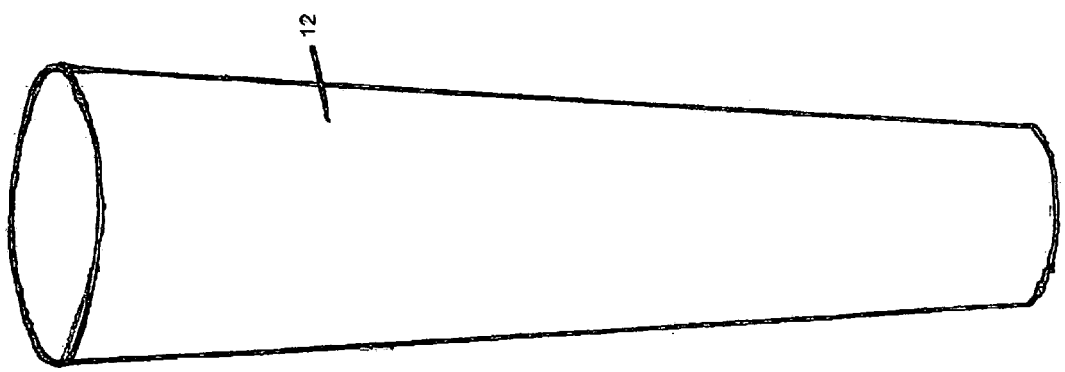
FIG. 3 is a side perspective view of the shroud of the present invention (without the cap).

FIGS. 3 and 4 disclose elements of the shroud assembly, notably the shroud 12 which also includes the lower shroud lip 58, the lower shroud flange 59, the shroud hook flange 90 and the shroud hook opening 92.

FIGS. 5 & 6 reveal features associated with the post 20 and the universal ring support 60, where the screws 64 include the screw head(s) 94, the screw body 96 and the screw end 98. The universal ring support includes the ring support screw hole 100 and the ring support joint 102, located across from the ring support flange 106(a) and 106(b) with corresponding ring support flange screw holes 108(a) and 108(b) and with ring support screw 104. The universal ring also has ring support spring holes 109 disposed about its circumference.

Figure 7:
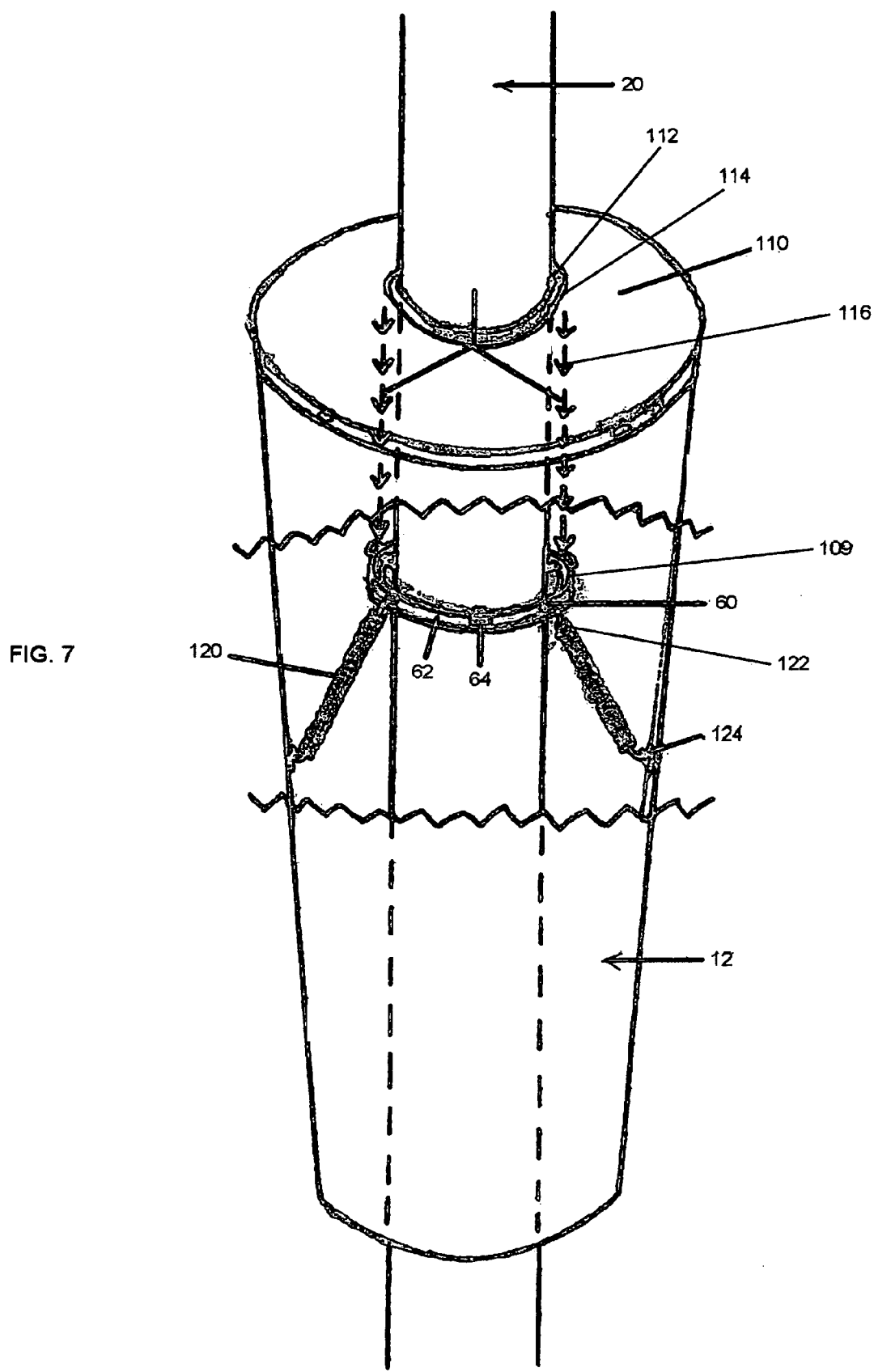
FIG. 7 is a side perspective view of a shroud assembly of the present invention as mounted onto a post, with a cutout disclosing the universal ring support and the engagement of the springs between it and the shroud.

Turning now to FIG. 7, the preferred embodiment for suspending the shroud 12 from the post 20 is shown. The universal ring support 60 is seen with the universal ring 62 and the ring screws 64. The shroud includes the shroud cap 110, and the shroud cap opening 112 and the shroud cap flange 114. Extending from between the universal ring and the shroud interior are two springs 120 with upper spring ends 122 and lower spring ends 124. The universal ring support, as will be discussed below, is fixed to the post in the position shown, by engagement of the upper spring end (which terminates in a hook shape) with the ring support spring holes 109. The shroud, being connected to the universal ring support by means of the springs, is free to move in at least a vertical direction which is indicated by the directional arrows 116. In this depiction, the shroud is unloaded since there is no squirrel attempting to traverse the structure, therefore the shroud, relative to the post, is in a resting condition. If a squirrel were to climb onto the shroud, the directional arrows 116 show the direction of travel that the shroud would take relative to the post.

With respect to the foregoing, the bird feeder post of the preferred embodiment utilizes a tapered shroud (with related components, the shroud assembly) positioned somewhat in the middle of a post suitable for supporting bird feeders. The tapered construction is meant to decrease the amount of purchase that an animal like a squirrel can obtain when confronting the shroud, which assists in inhibiting the animal from climbing further. For the purposes of the discussion, any reference made to a squirrel is meant also to encompass any other animal that may constitute a pest when it comes to preserving bird feed for birds. Thus ferrets, weasels, rodents, and any other animal that earns it's living by climbing, would be the intended pests that the invention would be directed towards.

The angle of the taper (relative to a fixed reference such as the post) is not critical except it is preferred to maximize the angle to the extent possible without exceeding cosmetic considerations. The more angle the animal has to overcome, in essence, the better. The preferred embodiment is shown in frusto-conical configuration although it is understood that other geometric configurations could be used as well, including parallelograms, oval cylinders and any other configuration that would impart am angle that would frustrate the animal. In the preferred embodiment, the shroud is a one-piece item and comes as a component of a kit containing the post and the plaque assemblies. Since all the parts are made for compatible assembly, the shroud cap fits over the top of the post and the shroud cap opening is sized to allow a small amount of clearance. The clearance has to be sufficient to allow the shroud cap to "rock" a few degrees relative to the post when the animal is attempting to climb the shroud. The reason for this requirement comes from the lower shroud opening 56 (which is seen in FIG. 2(*a*)) and which is viewable (but not called out) in FIG. 4. The lower shroud opening is larger than the shroud cap opening which means that the shroud is free to move laterally and front-to-back (as well as vertically) about the post. This movement is more exaggerated at the lower shroud opening than at the shroud cap which is the preferred result.

It can now be appreciated that an animal attempting to traverse the shroud will be confronting multiple effects. The shroud will react to the weight of the animal by vertical displacement while at the same time the shroud movement is able to be experienced in several ways depending on the imbalance that is achieved by the weight of the animal. For instance, the unlucky squirrel will soon find itself being moved about in three dimensions and in a random pattern that will change as the squirrel attempts to correct his balance. This multiple effect, coupled with the tapered shroud, maximizes the inhibiting effects of the present invention.

One skilled in the art can appreciate that the shroud can be adjusted to move with greater or lesser effect, which can be adjusted to fit the circumstance. In fact, it is a feature of the present invention that the effect can be modified to meet the needs for any particular animal that may be encountered by increasing the length of the springs, and/or by increasing the amount of "rock" that can be imparted to the shroud.

Placement of the shroud assembly onto the post can commence before the bird feeder post is assembled. The universal ring support is positioned as may be indicated by the manufacturer or as may be desired by the end user. The universal ring is merely slid over the top of a post segment and is thereafter secured to the post directly by means of the ring screws. The ring screws are tightened down until the screw ends contact the post and enough tension is created to firmly engage the universal ring to the post. The screws may have winged tops for turning by hand or they may be slotted screws turnable by a driver.

As was discussed above, the upper spring ends are connected to the universal ring by means of hook engagement with the ring support spring holes 109. A similar situation results for connection of the lower spring ends to the shroud through the shroud hook openings 92. In the at-rest condition, the shroud is substantially centered about the post and the spring bias it to keep it relatively vertical. It is only when the animal attempts to mount the shroud that the multiple displacements occur. One aspect of the preferred embodiment is when the universal support ring is used, the amount of travel can be adjusted so that the shroud cap can bottom out on top of the universal ring itself This imparts an abrupt stop to the downward travel of the shroud assembly which is considered to be a beneficial effect given that it will tend to dislodge a squirrel that is trying to react to the myriad other effects it is experiencing.

Figure 13:
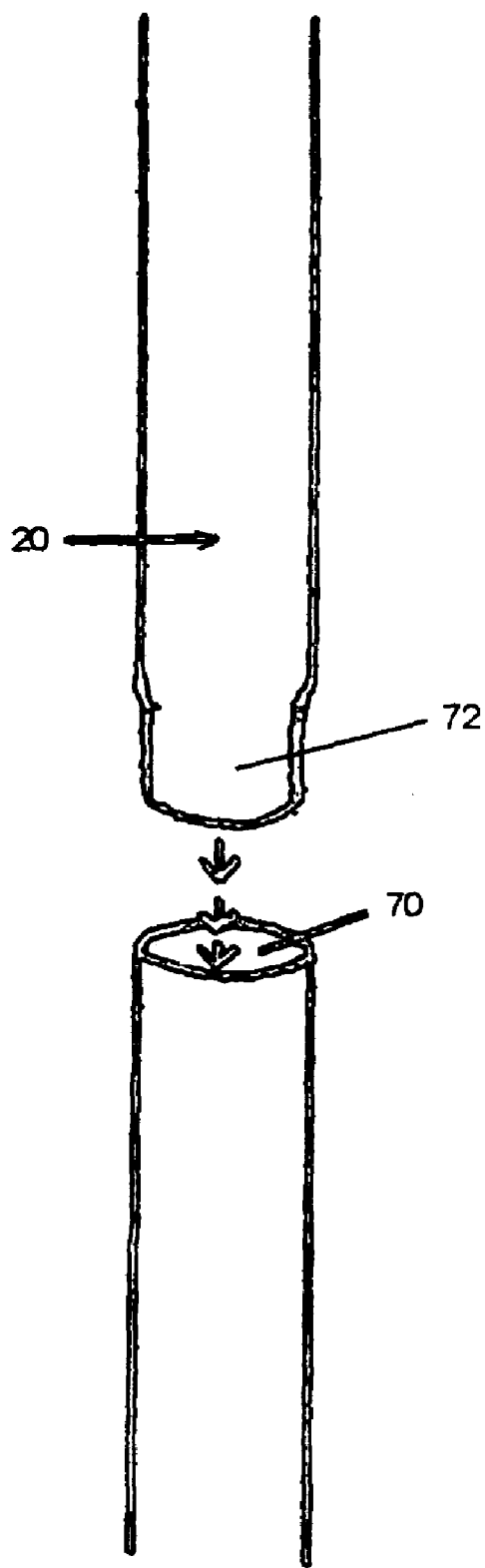
FIG. 13 is a side perspective view of two post segments of the present invention shown in alignment for installation.
Figure 14:
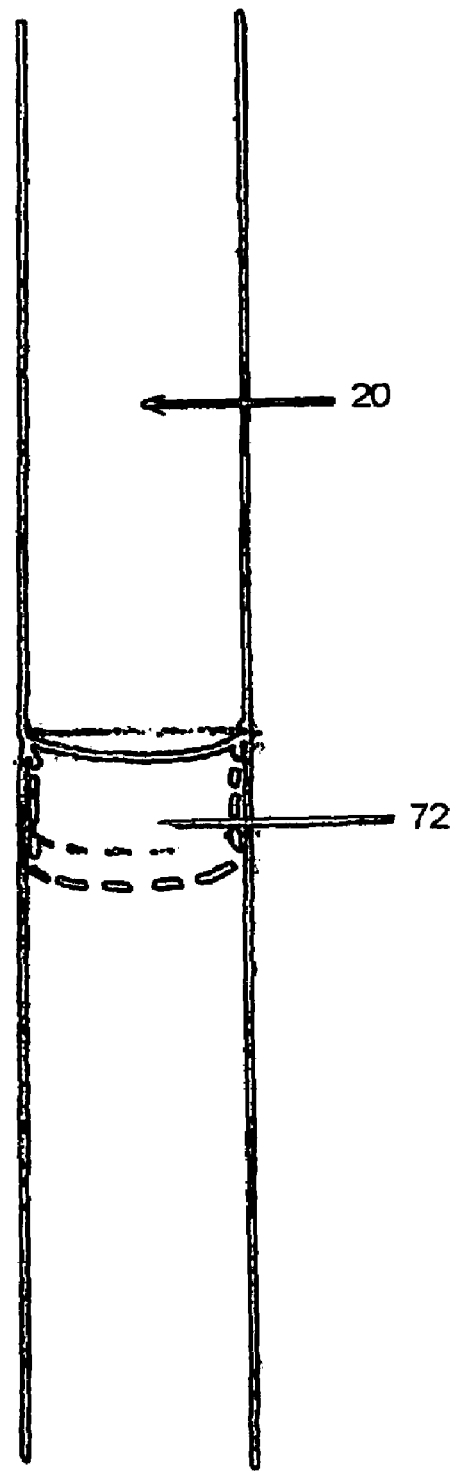
FIG. 14 is a side perspective view of the two post segments shown in FIG. 13, in the installed condition.

The shroud assembly, once affixed to the post segment, is integrated into the post construction as all of the post segments are telescopically connected. This feature is depicted in FIGS. 13 and 14 and is relevant for any embodiment using a multi-piece post construction. Specifically, the post 20 is made up of segments that are fitted together by means of the insertion of the male post portion 72 into the female post receiver 70. The lower post segment may be fitted with the auger beforehand, where the auger base is inserted into the bottom of the lower post segment and is retained by the auger pin which is inserted into the auger pin orifices in the lower post segment. The end result is a firmly engaged auger base. At this point, the user may insert a bar of some length, into the post driver orifice, and then using the mechanical leverage thus obtained, turn the lower port segment (or the whole post assembly) causing the auger tip to bite into and drive the bottom of the post into the ground. The depth, as indicated in FIG. 1, is typically about 12" or so and will vary depending on soil conditions, the anticipated weight of the entire bird feeder post and bird feeder, and the location. In the alternate, it would be possible to forego the usage of an auger altogether and to insert the bottom of the post into a posthole for instance, and fill it with cement. The preferred embodiment, however, is to supply an auger with the bird feeder post so as to enhance the ease of installation for people who need or want a quick do-it-yourself project.

The universal ring support is provided in the preferred embodiment with the intention that it can easily be installed onto the post. The universal ring typically provides a gap between it and the circumference of the post to which it is attached. The ring screws can be threaded through the universal ring and contact the post directly, the tension be fixed to make sure the universal ring support, and the shroud assembly, are adequately suspended. This gap also allows the universal ring support to be used in different sized applications, hence the term "universal." The universal ringjoint 102 allows the ring to be expanded for those times when it is not possible to thread the universal ring onto a post or post segment. Given that the opposing location on the ring is open, at the corresponding universal ring flanges 106(*a*) and 106(*b*), the ring may be spread sufficiently to allow it to be installed onto a post.

In the preferred embodiment the shroud may be fixed to the springs by means of the shroud hook flanges and their corresponding through holes. The flanges may be formed up from metal from the shroud directly, which can be easily done by a metal punch, for instance. A suitable through hole might be drilled or punched first, then a tab containing the through hole would be punched and turned into position. In the alternate, right-angled brackets can be formed separately and then welded or affixed to the sidewall interior to the shroud. Other methods for affixing the lower spring ends are known, including directly welding them to the shroud interior, gluing them, or affixing them with rivets or other fasteners. One skilled in the art will appreciate that many suitable methods may be used for this purpose without departing from the spirit of the invention.

The shroud cap is installed onto the top edge of the shroud with the shroud cap flange extending around the outer circumference. Alignment of the shroud cap holes with similar corresponding hole near the top edge of the shroud provides a means for securing the cap to the shroud by using sheet metal screws or other fasteners. The shroud cap is then affirmatively engaged which helps to prevent any smaller animals, ones that might be small or agile enough to wedge their way into the interior of the shroud at the lower opening, from proceeding any further since the cap opening is much more closely fitted to the post. This arrangement also helps to protect the interior of the shroud from the weather and from debris being lodged therein.

Figure 11:
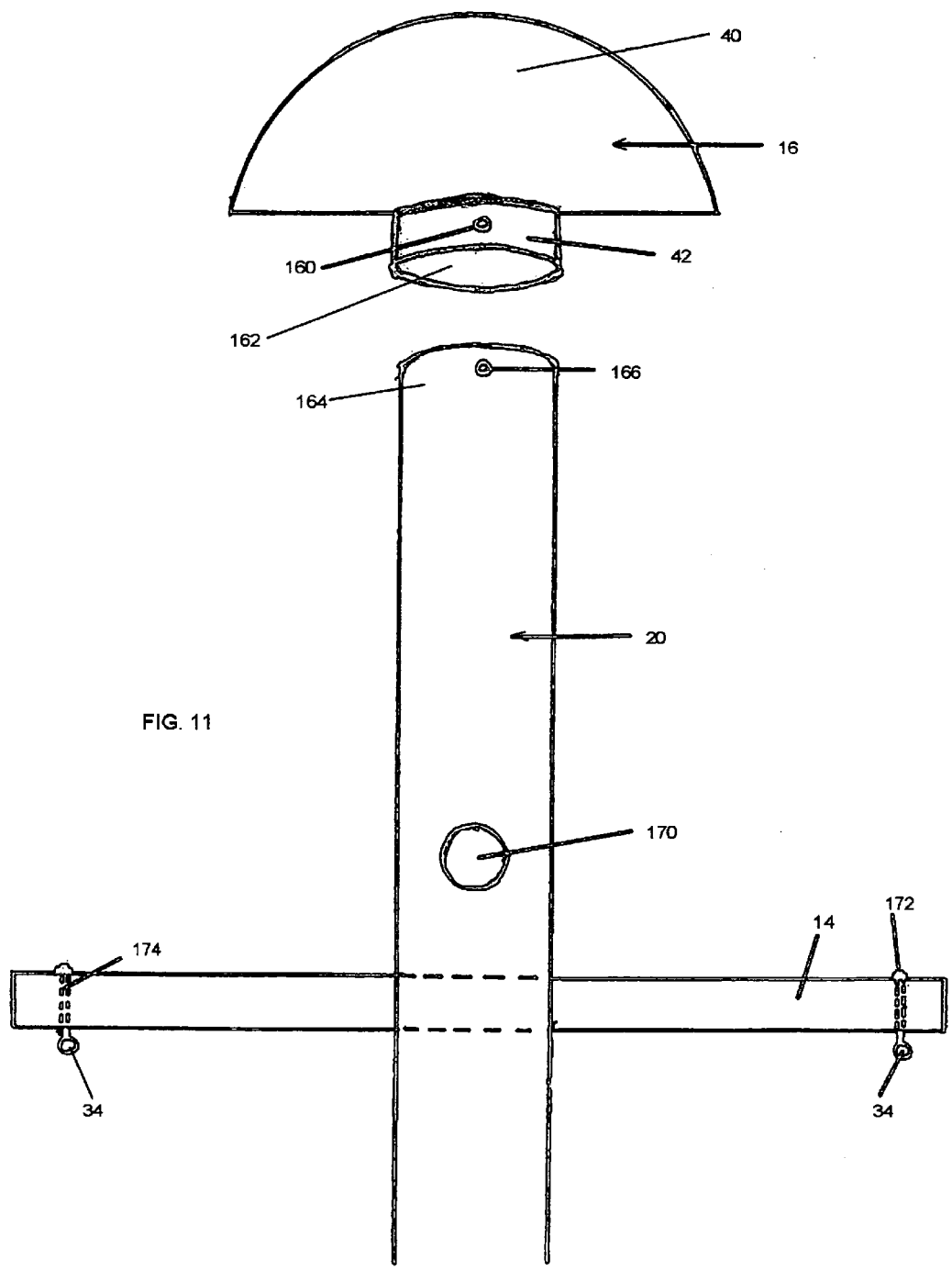
FIG. 11 is a side elevational view of the top portion of the post of the present invention, showing the ornamental plaque and the support for hanging or holding a bird feeder.

The ornamental plaque is a feature that enhances the cosmetics of the bird feeder post. It can be configured with an artistic design, or a relief, or it can portray an affinity symbol such as a sports team, a favorite college, or other treatment. The plaque is interchangeable and mounts easily to the top of the post. More specifically, in accordance with the teachings of FIG. 11, the ornamental plaque 16 is comprised of the plaque top 40, the plaque base 42, the plaque through hole 160 and the plaque base opening 162. It is assembled onto the post top 164 where the plaque base opening 162 is aligned with the post top through hole 166. The top portion of the post also includes support orifices 170, one of which is shown with a support installed. The support includes the eyelets 34, which are further associated with the eyelet head 172 and the eyelet shank 174. For convenience of installation, two support orifices (hence two positions for the support) are provided The user can also, if so desired, install a second support for more bird feeders. The bird feeders are typically hung through the eyelets.

Figure 12:
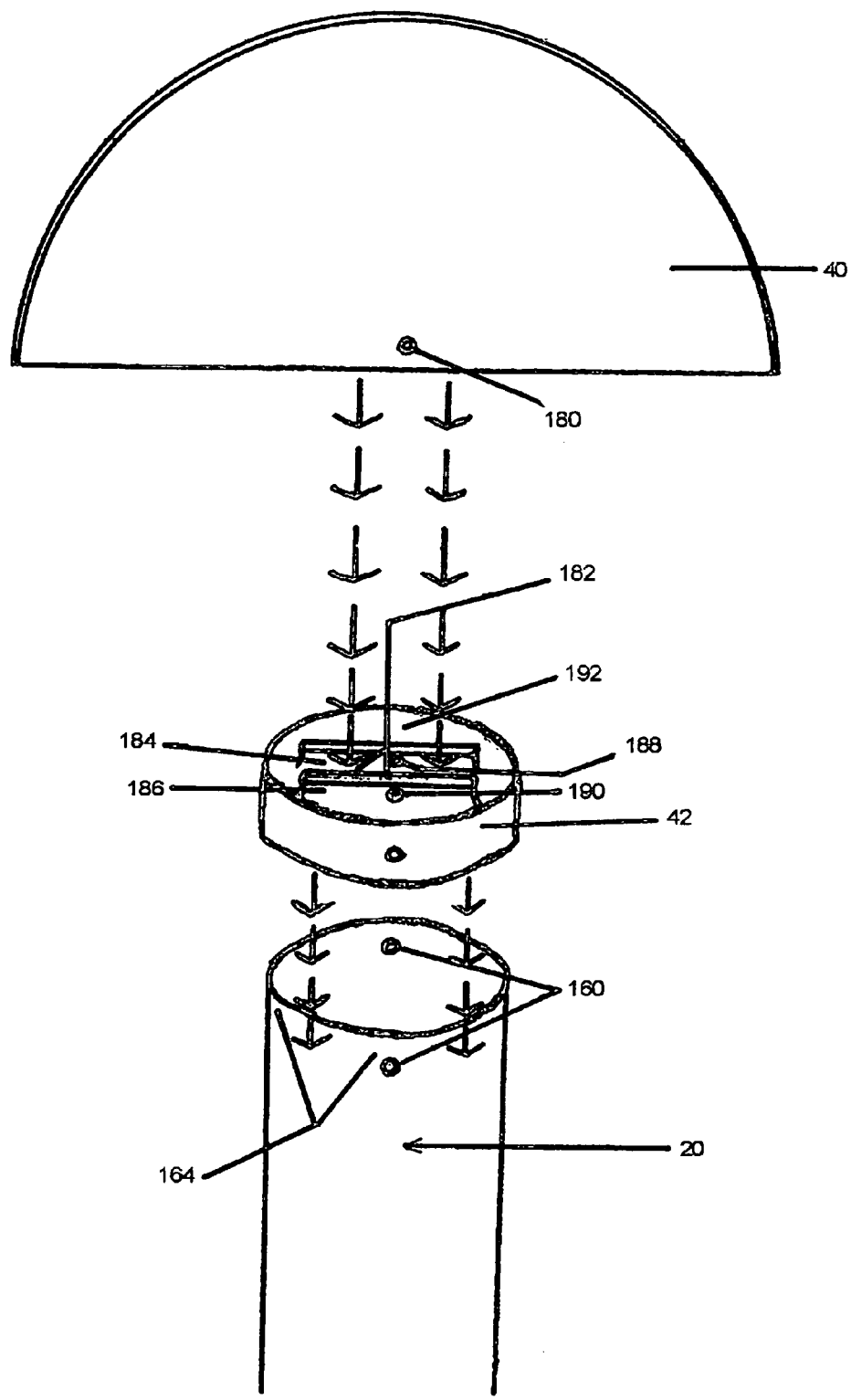
FIG. 12 is a side perspective view of the ornamental plaque of the present invention, in alignment for installation onto the top of the post.

A closer look at the ornamental plaque is found in FIG. 12, where the plaque has the plaque top 40, the plaque top through hole 180, the plaque mount 182, the plaque mount slot 184, the front mount flange 186, the rear mount flange 188 the plaque mount through hole 190 and the plaque base top 192. As can be seen, the plaque top is insertable into the plaque mount, fitted in between the front mount flange and the rear mount flange, and is secured by means of a setscrew that enters the mount through hole and engages the plaque top through hole. The benefits of the plaque include the ease in which it can be installed, and therefore the ease with which it may be interchanged, for various purposes such as seasonal treatments. The plaque base is likewise fixed to the post top by means of the post top through holes 166 which correspond to the plaque though holes 160. The plaque base has the benefit of sealing the interior of the post from the elements.

Another embodiment of a shroud of the present invention is shown in FIG. 8, where the shroud 12 is in the installed condition on a post 20. In this embodiment, the shroud is essentially the same, however the upper shroud holes 134 are revealed and are the through holes that align with the shroud cap holes 132. The shroud cap opening, however, has the shim 130, which further includes the shim seat 131. Once the shroud cap is installed (in the direction shown), the cap can be secured to the shroud as mentioned previously, by sheet screws or other fasteners. The usage of the shim is a different feature, however, since it is intended to take up space between the edges of the shroud cap opening and the post, acting like a sizing shim. It can be fabricated from an elastomeric material and can be wedged into place to ensure a snug fit. Being that it is a flexible material, the shim will still allow the shroud to "rock" as is desired, however it does operate as an improved seal. Versions of shims may be considered where they can be configured to be retained by the edges of the cap opening, or where they may be affixed to the cap by more affirmative means that may be available to one skilled in the art.

One additional advantage of this alternate embodiment is the ability to fit the shroud assembly to different sized posts, which is done through the use of differently sized shims. For those occasions where the shroud assembly may be fitted to existing posts, outside of a kit approach.

Figure 10:
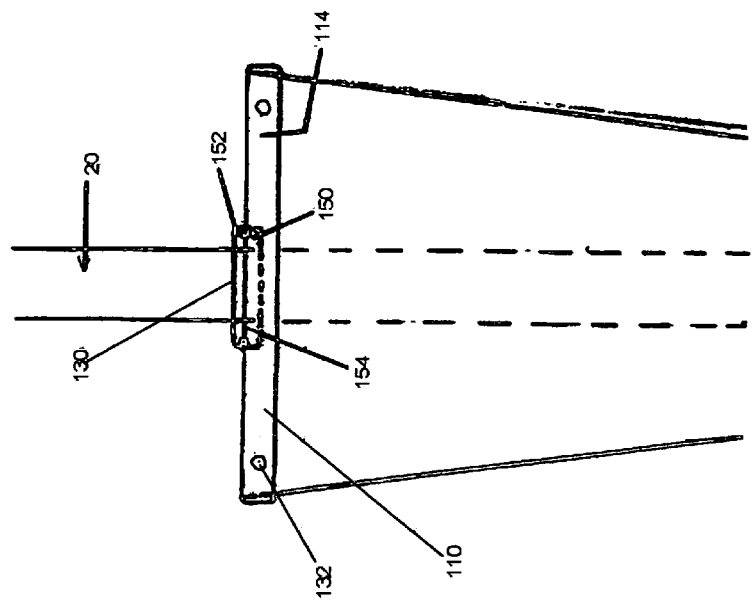
FIG. 10 is a side elevational view of an alternate embodiment for a shroud assembly of the present invention, as mounted on a post.
Figure 9:
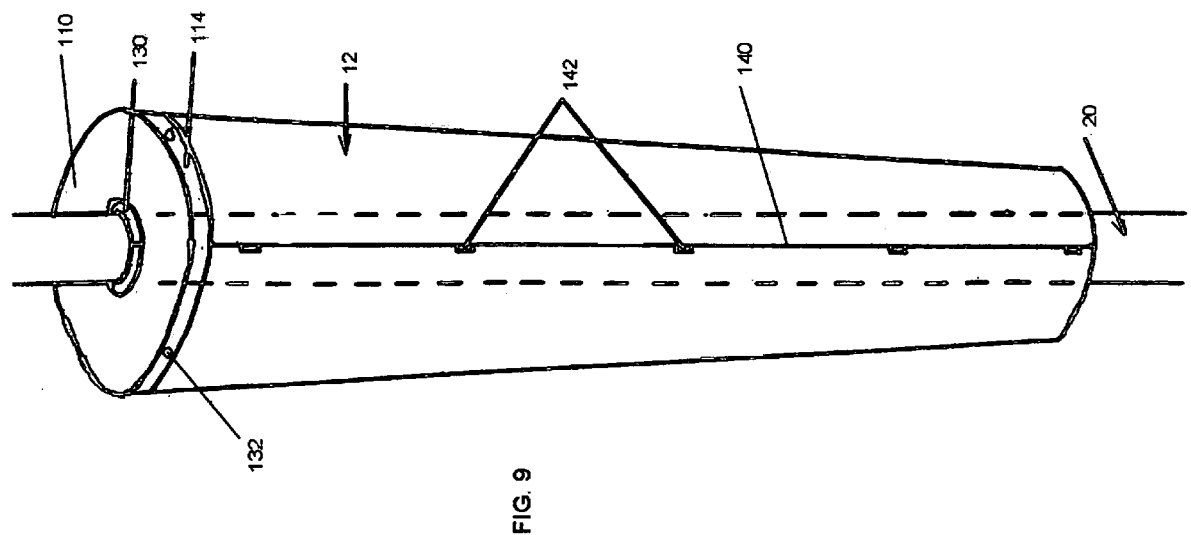
FIG. 9 is a side perspective view of an alternate embodiment for a shroud assembly of the present invention.

FIGS. 9 and 10 show another embodiment of a shroud for use in the present invention. The shroud cap includes the cap shim 130 with shroud cap flange 114 is installed onto a shroud 12, and affixed thereto by means of fasteners threaded into the cap holes 132. The shroud includes the shroud seam 140 and the shroud tabs 142. Reference to FIG. 10 shows the shim as being inserted in between the edge of the shroud cap opening and the circumference of the post 20. In this case, the shim is comprised of the shim bottom 150, the shim top 152, and the shim recess 154. The shim may be configured as an uninterrupted piece, or it may have a parting somewhere along its circumference. A shim of the latter type can be custom fitted to an application which may be required where posts of different diameters are encountered or where weather or paint have altered the original dimensions of the post. The shim has a recess that is compatible with engagement of the edge of the cap opening, which helps to retain the shim in place. As was the case for the shim described above, the benefits include the enhanced sealing of the space between the cap opening and the post as well as the advantage of being able to size the cap for different sized posts; a desired attribute for retrofitting bird feeder posts.

The shroud in this embodiment is split longitudinally, (seam), which allows the shroud to be opened slightly and to be placed onto an existing post. This retrofit option is highly compatible with the shim associated with the same FIGS. In this instance, the seam is secured for closure by means of tabs that project through spaced and aligned openings along the shroud seam and which can then be turned over. This is one illustration of many methods that may be used to provide closure for the shroud in this embodiment.

FIGS. 15, 16(a), 16(b) and 16(c) all relate to another shroud cap embodiment. The shroud cap assembly 210 includes the shroud cap top 212, the universal ring support 214, the ring support screws 216, the screw heads 218, the screw shanks 220, and the universal ring 222. The ring screws are threaded through the shroud through holes 224. In this case, the shroud cap is integrated with the universal ring support. The ring screws are extended, with longer shanks that project far enough to engage the shroud through holes. The universal ring can be fixed to the post by tightening the screws down. This allows the shanks to be used to support the shroud cap which is a nominally flat piece with a center hole 226. The shroud cap may lay passively on top of the assembly or, as will be seen in the next embodiment, it may be affixed to the shroud.

The advantage of this version is that the installation of the shroud may be completed largely from the exterior of the unit.

Figure 17:
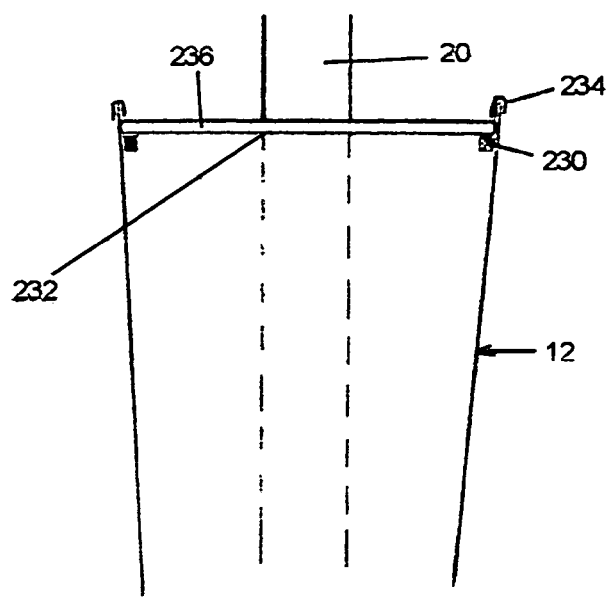
FIG. 17 is a side elevational view of an alternate embodiment for securing a shroud cap to a shroud assembly.

An alternate means for attaching a shroud cap to a shroud is shown in FIG. 17. In this instance, the cap 230 is installed onto post 20 by means of the shroud cap center hole 232. The cap extends outwardly towards the shroud where an upper tab 234 and lower tab 236 are turned appropriately to engage and retain the shroud cap.

Figure 18:
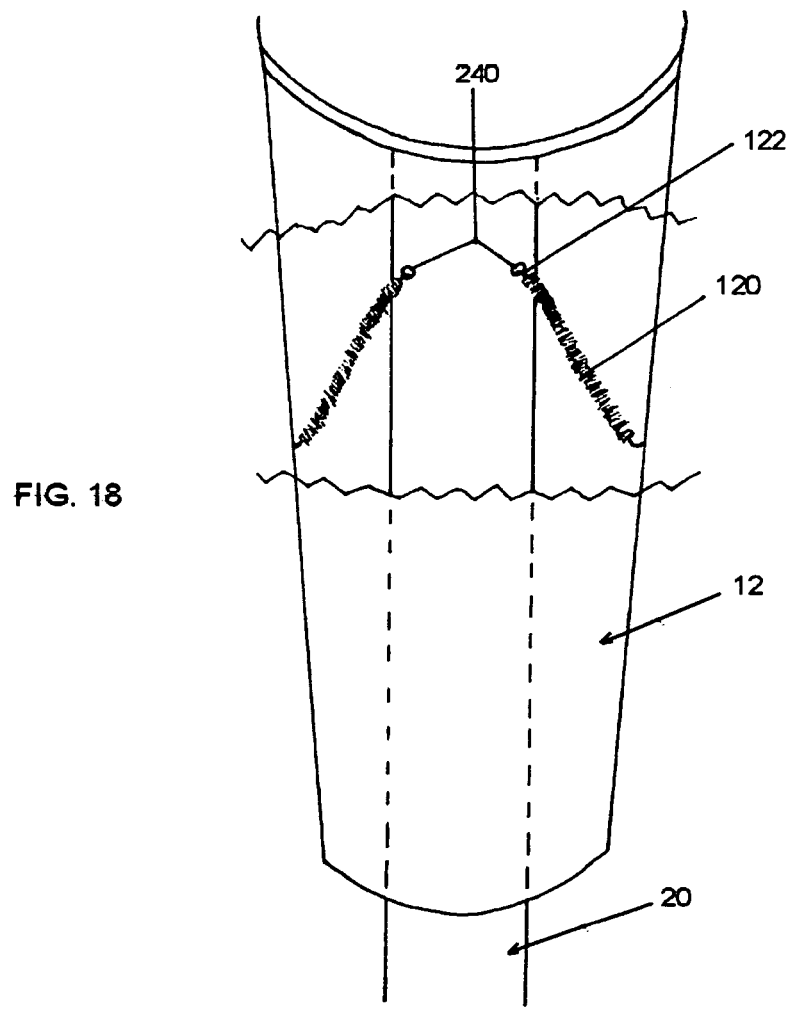
FIG. 18 is a side perspective view showing an alternate embodiment for securing a shroud assembly to a post.

The shroud assembly shown in FIG. 18 can be used in conjunction with the embodiments of FIGS. 15, 16(a), 16(b), 16(c) and 17, where the cap is allowed to "float" vertically along the post. In this instance the springs 120 are affixed to the post spring holes 240. The lower spring ends 124 are also attached to the interior of the shroud but this is shown in the next FIG. As may be appreciated, the post spring holes are punched out of the metal making up the post. This arrangement allows the shroud to float on a direct connection to the post, irrespective of the type of shroud cap that is employed.

Figure 19:
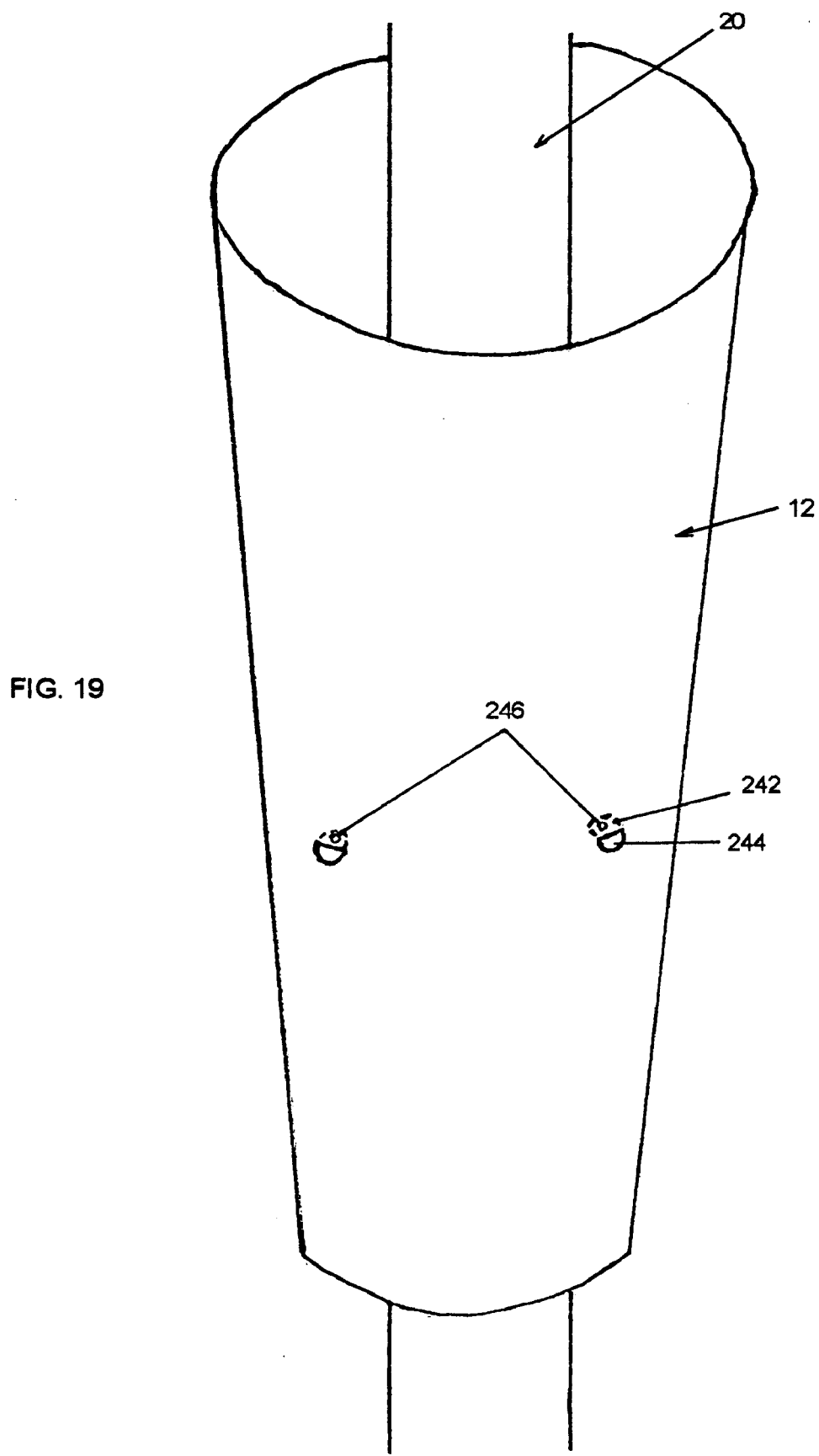
FIG. 19 is a side perspective view of a portion of a shroud assembly of the present invention in a position to be secured to a post.

A shroud suitable for use with the embodiment of FIG. 18, is shown in FIG. 19. It includes shroud spring tabs 242, the spring tab forms 244 and the spring tab openings 246. The tabs are formed towards the interior of the shroud such that the spring tab openings can be engaged with the lower spring ends.

Figure 20:
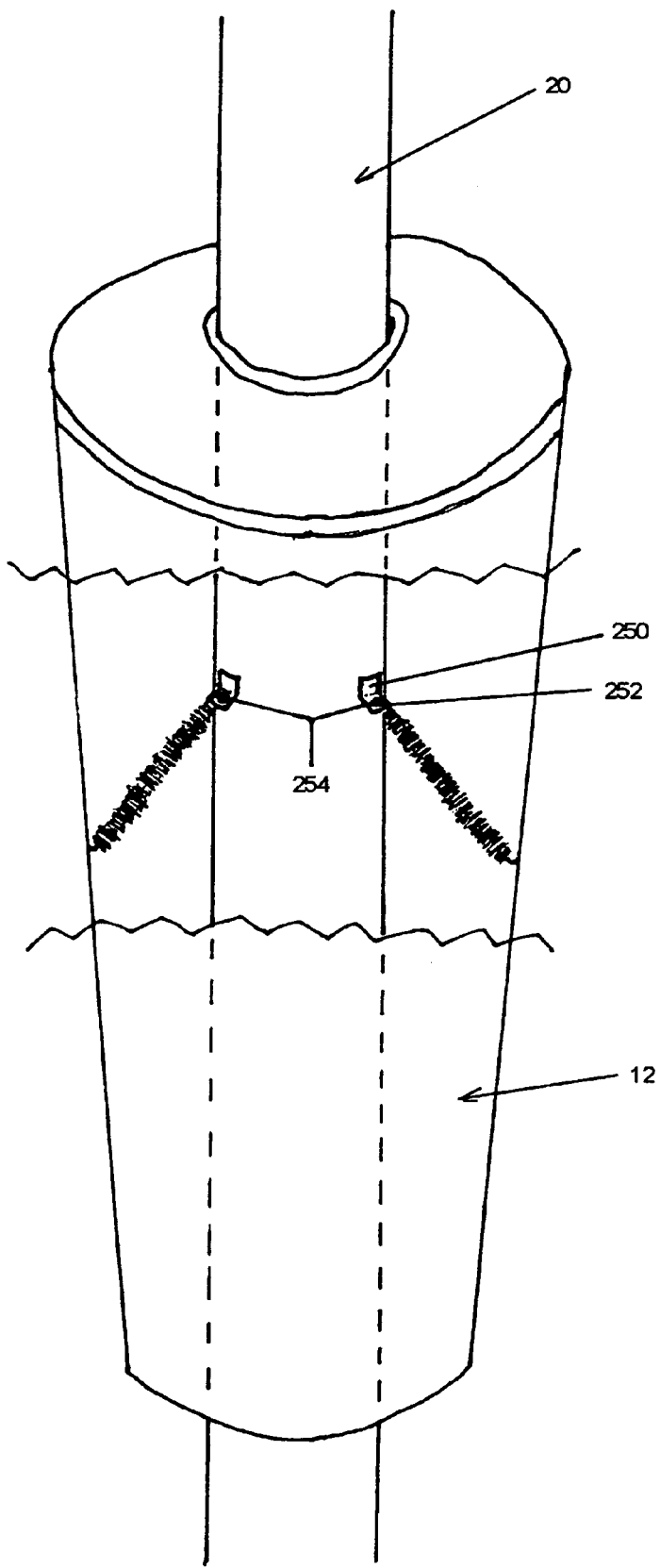
FIG. 20 is a side perspective view of an alternate embodiment of the shroud assembly of FIG. 19 as secured to a post.

FIG. 20 discloses yet another embodiment for securing the shroud to a post. In this instance, the post spring tab 250 includes the spring tab form 252 and the spring tab opening 254. The spring tabs in this embodiment can be formed out of the material making up the post, or they may be fabricated separately as brackets that are attached to the post.

Figure 22:
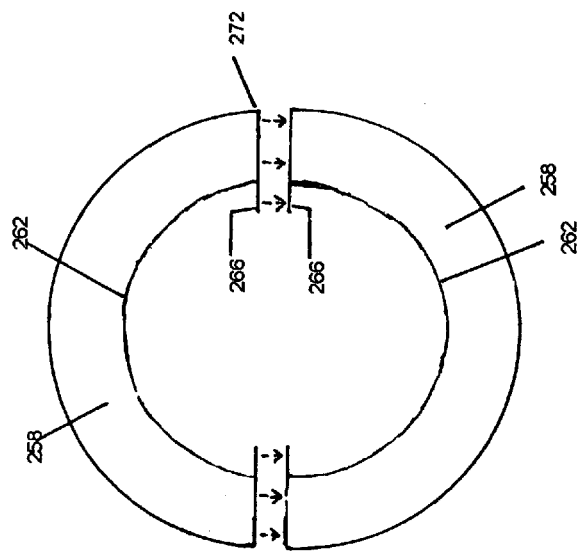
FIG. 22 is a top view of the shroud assembly of FIG. 21.
Figure 21:
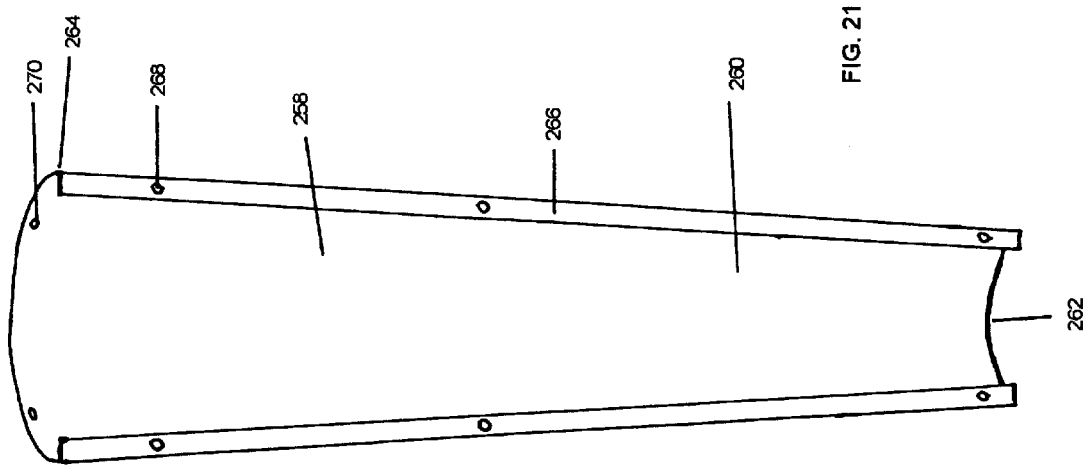
FIG. 21 is a side perspective view of a portion of an alternate shroud assembly of the present invention.

FIGS. 21 and 22 teach another type of shroud. In this instance the shroud is halved. Specifically, shroud half 258 includes the shroud interior 260, the shroud bottom 262, the shroud top 264, the shroud seam flange 266 which itself includes the seam flange holes 268. Located near the top of the shroud are the shroud top holes 270. When two halves are brought together, as in FIG. 22, the junction where the seam flanges meet forms the seam 272.

The shroud halves in this embodiment can be mounted onto existing posts, which is clearly an advantage, although this feature does not limit the application to existing posts only.

There is some efficiency in manufacturing this version since the shroud halves are easier to form.

Figure 23:
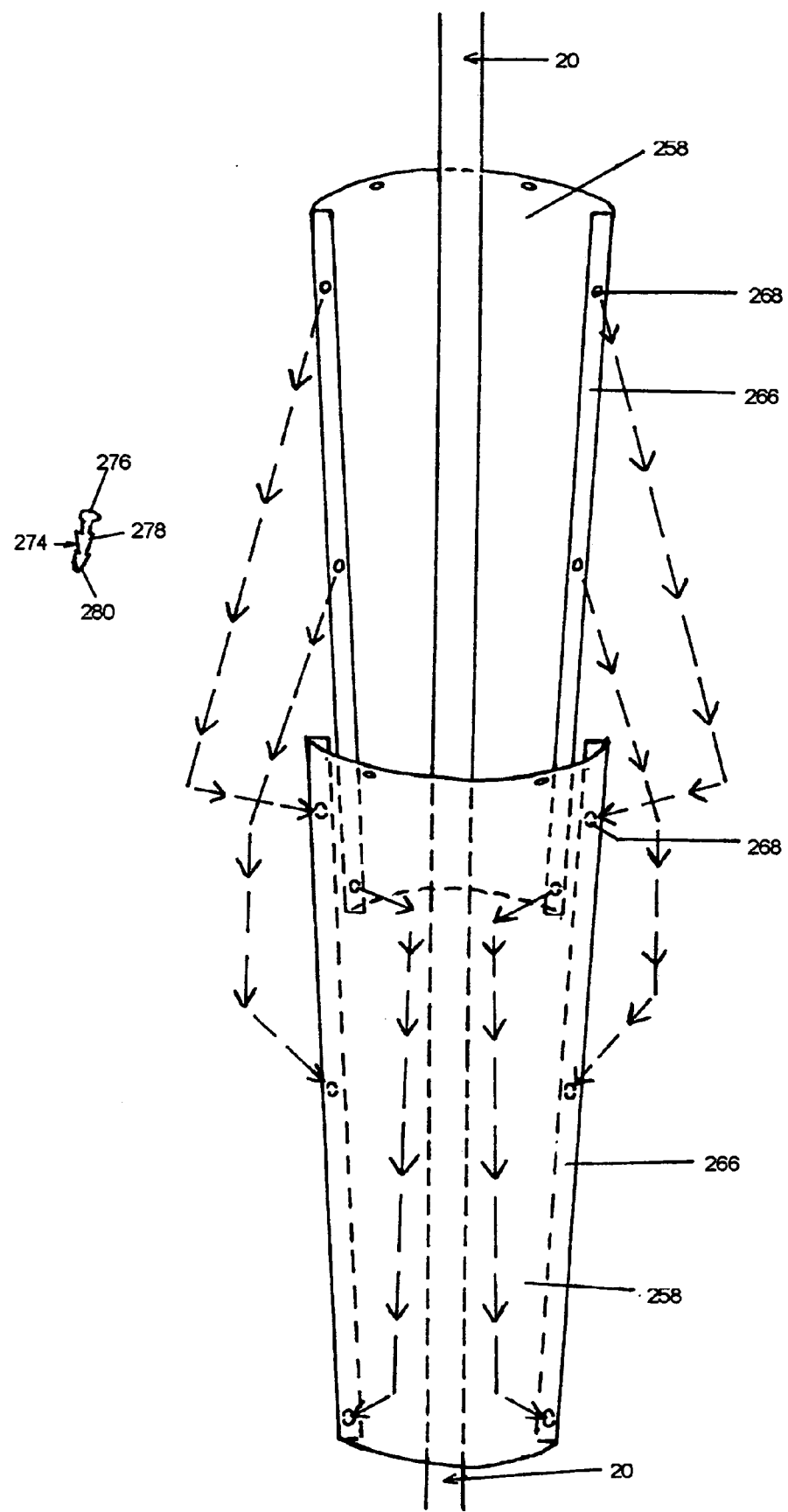
FIG. 23 is a side perspective view of the shroud assembly of FIG. 21 shown in relation to its installation onto a post.

FIG. 23 is an additional illustration of the present embodiment. Two halves are brought together in a condition for installation on the post. The nomenclature and numbering for this illustration remains the same, excepting the front halve is given the designation (b) and the rear half is given the designation (a) to more clearly show the difference between the two. The Christmas Tree fastener 274 is shown with the fastener head 276, the fastener shank 278 and the fastener end 280. The usage of the Christmas Tree fastener greatly enhances the ease of installation since the fastener need only to be plunged into the seam flange holes and the barbs along the shank of the fastener will engage the opposing flange surface and retain the seam flanges together.

Figure 24:
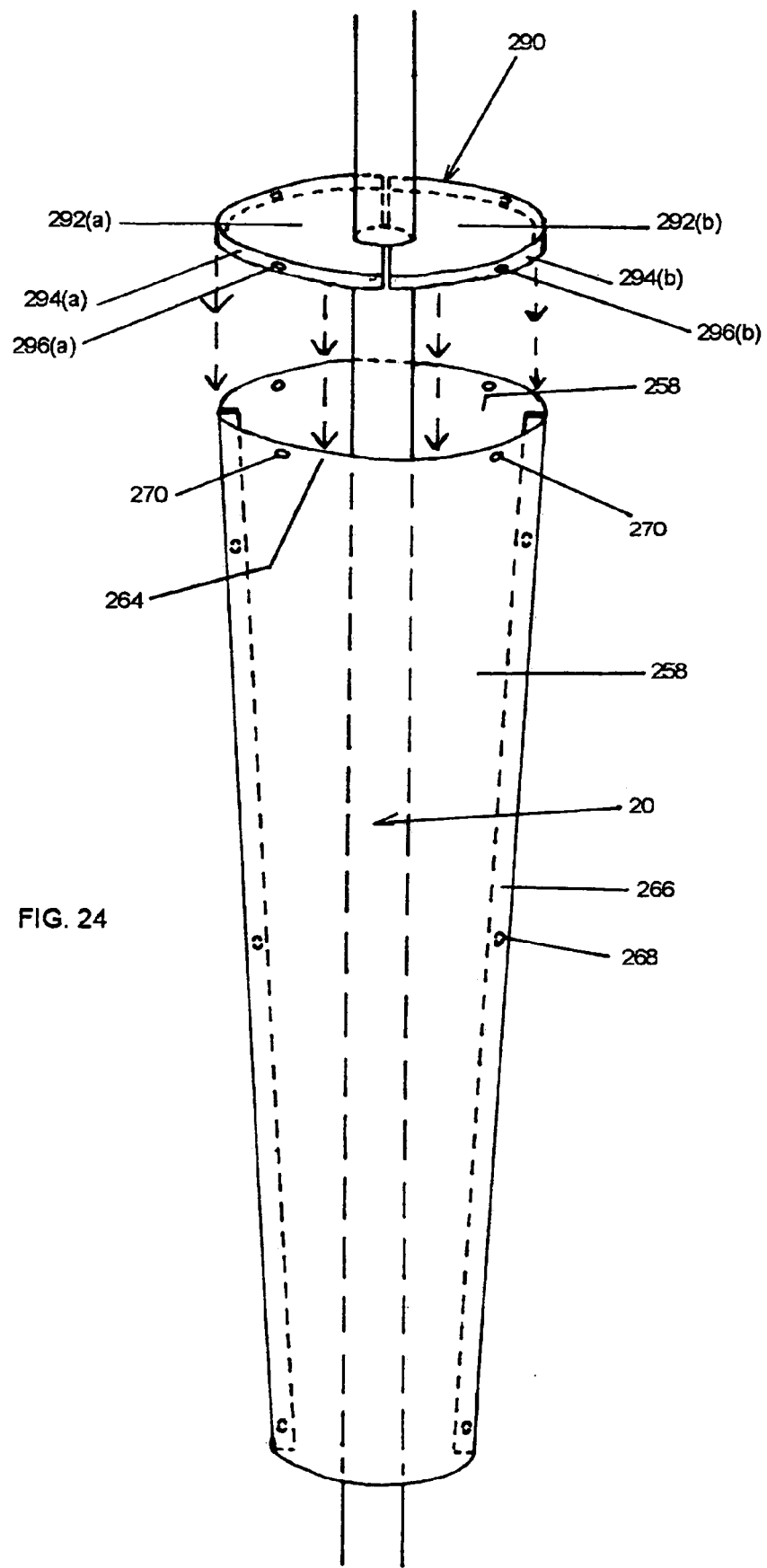
FIG. 24 is a side perspective view of the shroud assembly of FIG. 23, oriented in the installed condition and with a two-piece shroud cap.
Figure 25:
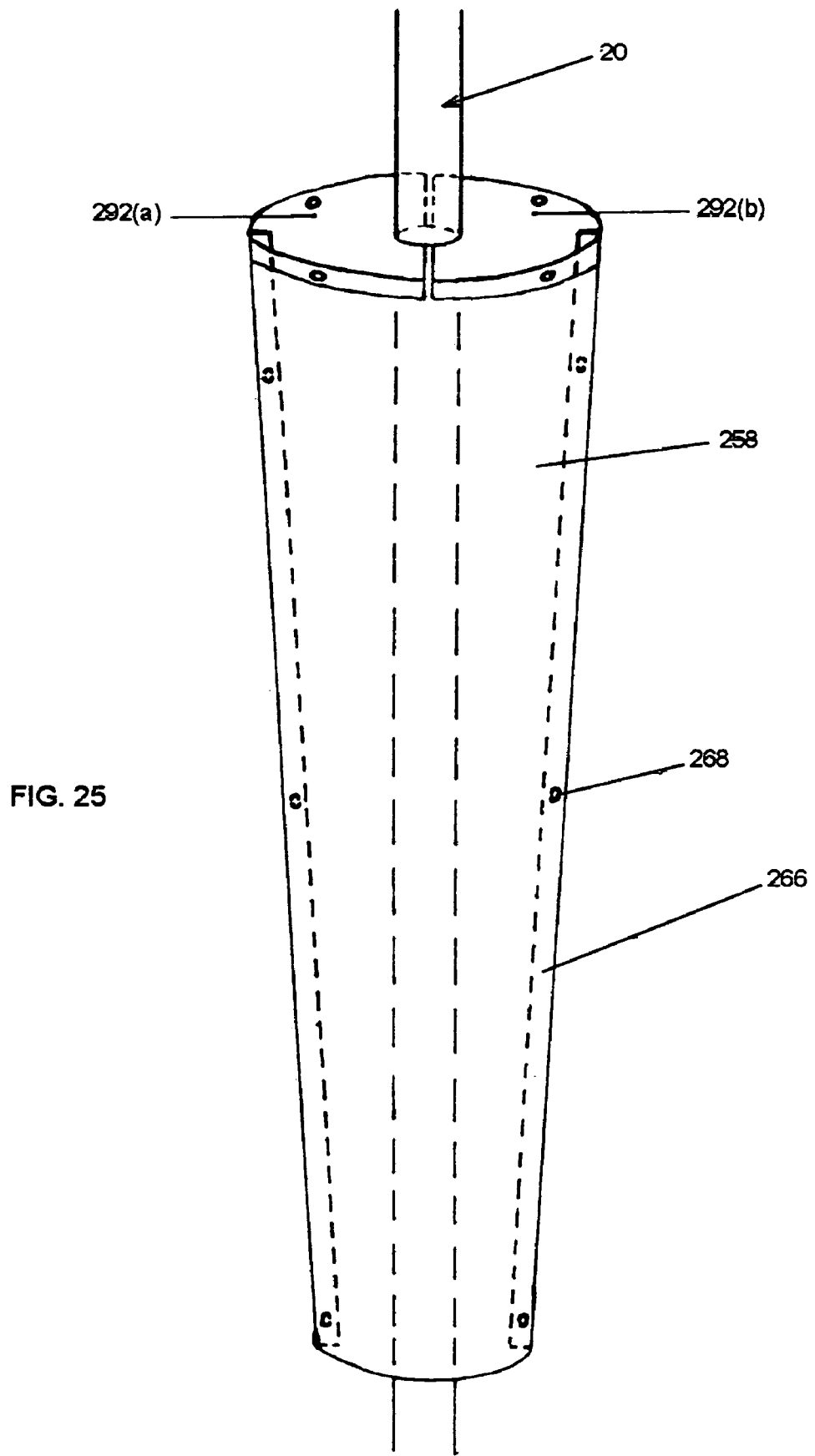
FIG. 25 is a side perspective view of FIG. 24 with the two-piece shroud cap in the installed condition.

FIG. 24 continues the treatment of the present embodiment with the addition of the shroud cap 290, the shroud cap halves 292(a) and 292(b) and associated shroud cap flanges 294(a) and 294(b), and shroud cap holes 296(a) and 296(b). This cap design is compatible with the usage of shroud halves for the bird feeder post of the present invention. The split cap approach preserves the ability to install the shroud onto an existing post. FIG. 25 shows the same embodiment with the shroud cap fully installed thereon.

Figure 26:
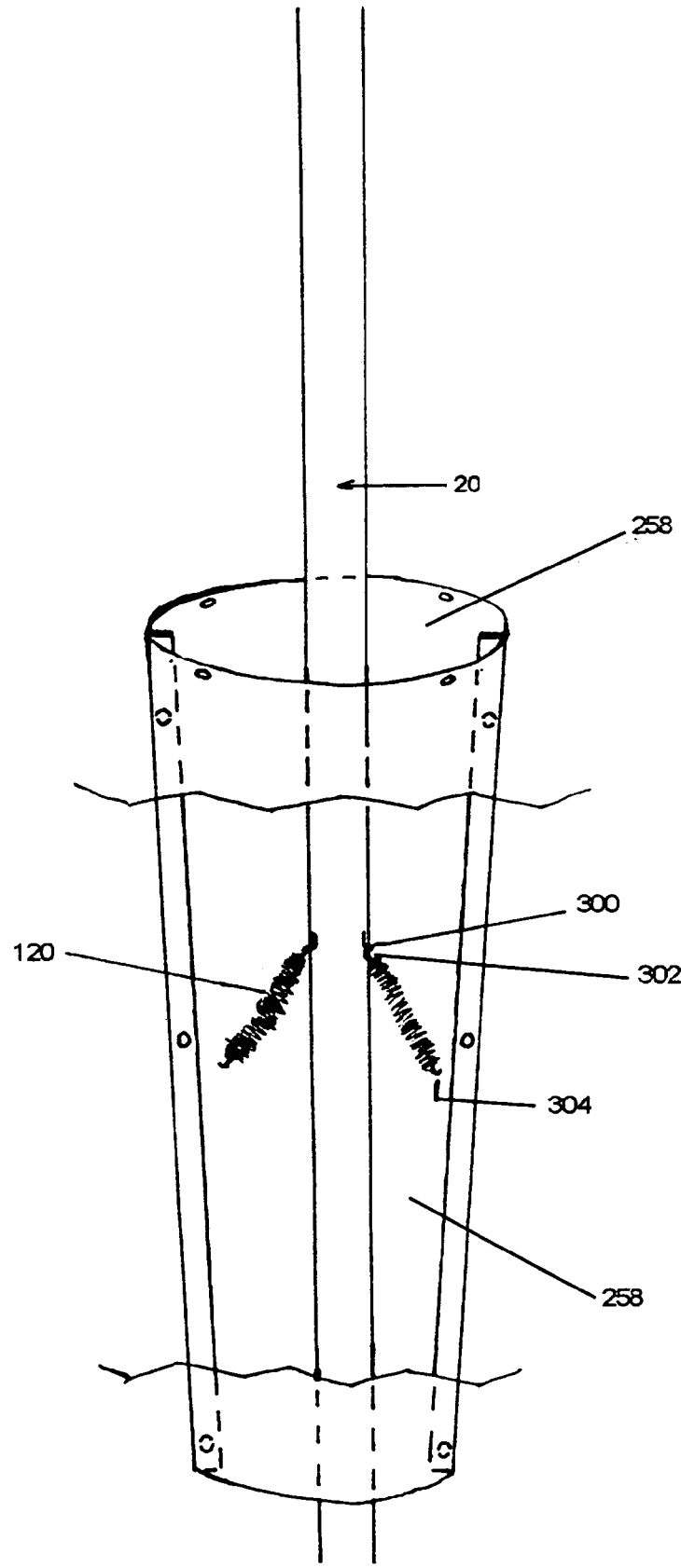
FIG. 26 is a side perspective view of the shroud assembly of FIG. 23, showing the attachment of the springs to the shroud assembly and to the post.

FIG. 26 discloses the suspension means for the present embodiment. The shroud halves are shown and springs 120 are attached to the post spring holes 300 by the upper spring ends 302. The lower spring ends 304 are shown however the shroud spring holes that would be associated with their attachment to the shroud are not shown.

The versions of the present invention may be fabricated from such materials and through such methods as one reasonably skilled in the art may consider. Typically, the requirements that need to be met include sufficient support capacity for holding the structure and the weight of the bird feeder(s), and to ensure that weather and other environmental considerations are contemplated to prevent corrosion or loss of function.

The embodiments discussed herein admit to at least two commercial versions. One would be a kit whereby a complete post and shroud assembly is provided with instructions for assembly. The advantages of post segments become clear in this respect since the pieces breakdown for compact packaging and reduced shipping costs. Virtually any of the shroud embodiments would complement this approach.

The other version would be a kit form for retrofitting an existing bird feeder post. The need for posts or post segments would theoretically unnecessary, thus the focus would be on the shroud assembly. As indicated, those shroud embodiments that would be compatible with an existing post application would be preferred.

The ornamental plaque treatment is an enhancement to the bird feeder post that adds a cosmetic effect. It can be used on any open topped post of compatible diameter.

The objective of including multiple barriers to squirrel attacks on a user's bird feeder is a functionality that is uniquely married to a bird feeder post design that readily assumes a commercially acceptable form. The end result is a far superior approach to an advanced bird feeder system than has heretofore been known.

It is appreciated that variations from the teachings herein may be made without departing from the spirit and scope of the invention.

The invention claimed is:

1. A bird feeder post for supporting at least one bird feeder, where the post is subject to being fixed into the ground at the discretion of the user and where the post has an upper portion, a middle portion and a lower portion, and where the bird feeder post further includes a barrier preventing pests from climbing said post and reaching the bird feeder, the barrier comprising:
    A displaccable shroud with an inverted taper suspended in the middle portion of the post, said shroud including an upper shroud opening at the top center of said shroud and a lower shroud opening at the bottom with said post extending through said upper shroud opening and lower shroud opening;
    A ring support comprising a ring and screws threadably engaged with said ring, where said ring is annularly installed onto said post and fixed thereto by the turning of said screws until they affirmatively engage said post, said ring support being installed inside of said shroud, and where the ring support also including a plurality of springs that have one end of each of said springs attached to the ring support and the other end attached to the interior of the shroud; and,
    Where said shroud is displaccable about sad post when a pest attempts to climb the shroud, such displacement occurring vertically and also in directions whereby a point on the lower shroud opening is brought into contact with the post, any of said displacement of the shroud being restored to the non-displaced condition once the pest leaves the shroud.

2. The bird feeder of claim 1, where the shroud further includes a cap fittable onto the top of said shroud and where said cap includes the upper shroud opening.

3. A shroud for providing a barrier for preventing pests from climbing up a post supporting a bird feeder and reaching the bird feeder, the shroud comprising:
    A displaccable shroud with an inverted taper suspended in the middle portion of the post, said shroud including an upper shroud opening at the top center of said shroud and a lower shroud opening at the bottom with said post extending through said upper shroud opening and lower shroud opening;
    A ring support comprising a ring and screws threadably engaged with said ring, where said ring is annularly installed onto said post and fixed thereto by the turning of said screws until they affirmatively engage said post, said ring support being installed inside of said shroud, and where the ring support also including a plurality of springs that have one end of each of said springs attached to the ring support and the other end attached to the interior of the shroud; and,
    Where said shroud is displaccable about sad post when a pest attempts to climb the shroud, such displacement occurring vertically and also in directions whereby a point on the lower shroud opening is brought into contact with the post, any of said displacement of the shroud being restored to the non-displaced condition once the pest leaves the shroud.

4. The bird feeder of claim 3, where the shroud further includes a cap fittable onto the top of said shroud and where said cap includes the upper shroud opening.

* * * * *